(12) United States Patent
Hubert (10) Patent No.: US 7,627,625 B2
(45) Date of Patent: Dec. 1, 2009

(54) LONG-INTEGER MULTIPLIER

(75) Inventor: Gerardus T. M. Hubert, Geldrop (NL)

(73) Assignee: NXP B.V., Eindhoven (NL)

( * ) Notice: Subject to any disclaimer, the term of this patent is extended or adjusted under 35 U.S.C. 154(b) by 689 days.

(21) Appl. No.: 10/565,693

(22) PCT Filed: Jul. 22, 2004

(86) PCT No.: PCT/IB2004/002382

§ 371 (c)(1),
(2), (4) Date: Jan. 23, 2006

(87) PCT Pub. No.: WO2005/010745

PCT Pub. Date: Feb. 3, 2005

(65) Prior Publication Data

US 2006/0179105 A1   Aug. 10, 2006

(30) Foreign Application Priority Data

Jul. 26, 2003   (GB)   ................................ 0317570.0

(51) Int. Cl.
*G06F 7/53*   (2006.01)
(52) U.S. Cl. .................................................... 708/630
(58) Field of Classification Search ........................ None
See application file for complete search history.

(56) References Cited

U.S. PATENT DOCUMENTS 4,791,601 A * 12/1988 Tanaka ........................ 708/630
5,787,029 A * 7/1998 de Angel ..................... 708/628
6,421,699 B1 * 7/2002 Dhong et al. ................ 708/630

FOREIGN PATENT DOCUMENTS

WO   WO 94/12928   6/1994

OTHER PUBLICATIONS

L. Dadda: "Some Schemes for Parallel Multipiers"; Alta Frequenza ; vol. 34, No. 5; May 1965 pp. 349-356.
L. Dadda: "Some Schemes for Fast Serial Input Multipiers"; Proceddings of 6th Symposium on Computer Arithmetic Jun. 20-22, 1983; Aarhus University; Aarhus Denmark; Jun. 22, 1983; pp. 52-59.

* cited by examiner

*Primary Examiner*—David H Malzahn (57) ABSTRACT

An adder circuit for multiplying two long integers deploys a network of adders for summing a succession of words of the long integers to generate intermediate results. The number of addends varies as a function of bit position and the network of adders is designed to reduce the number of levels of adders in the network according to a maximum number of expected addends. A number of strategically placed extra adders may be positioned in the network to further reduce the number of levels. An output stage may be provided that adds sum and carry outputs of the network and retains a most significant bit for use with a subsequent calculation output of the network. The network may be configured so that a subsequent calculation by the network can commence before the previous calculation has been completed, the output of the previous calculation being fed back to the network at an intermediate level and its lowest (output) level.

24 Claims, 7 Drawing Sheets

LONG-INTEGER MULTIPLIER

The present invention relates to methods and apparatus for the multiplication of two long integers and the addition of a third long integer modulo a third long integer. Such multiplications must be carried out repeatedly during implementation of, for example, cryptographic algorithms in cryptographic processors such as those used in smart cards.

The increasing use of cryptographic algorithms in electronic devices has established a need to quickly and efficiently execute long integer modular multiplications. For example, smart cards and many other electronic devices use a number of cryptographic protocols such as the RSA, and others based on elliptic curve and hyper elliptic calculations. All of these protocols have, as a basic requirement, the ability to perform long integer modular multiplications of the form $R = X \cdot Y + Z \mod N$, although the addition of Z is not always required.

Typically, with protocols such as RSA, the long integers X and Y are 1024-bit, or even 2048-bit integers, and the multiplication operations must be carried out many hundreds or thousands of times to complete an encryption or decryption operation. It is therefore desirable that the cryptographic devices that perform these operations execute the long integer multiplications quickly.

An aspect of carrying out such long integer multiplications is to break down the long integers into a number of words and to successively multiply the words together in an iterative processes which produces a succession of intermediate results which are cumulated to obtain the final result. A feature of this technique is the necessity for summing a large number of addends of various lengths during each stage of the multiplication process. Therefore, the number of addends for any given bit position can vary significantly. Conventionally, such summation operations can be implemented using Wallace trees, bit these often make use of rather more hardware, and introduce rather more delay, than is desirable.

It is an object of the present invention to provide a method and apparatus for effecting long integer multiplication operations as quickly as possible.

It is an object of the invention to provide a more efficient method and apparatus for the summation of a large number of addends, particularly where the number of addend bits varies as a function of the bit position in the sum.

In one arrangement, an adder circuit for multiplying two long integers deploys a network of adders for summing a succession of words of the long integers to generate intermediate results. The number of addends varies as a function of bit position and the network of adders is designed to reduce the number of levels of adders in the network according to a maximum number of expected addends. An object is to adapt the network to include a number of adders that varies as a function of bit position.

In another arrangement, an output stage may be provided that adds sum and carry outputs of the network representing an intermediate result. An objective is to avoid delay in passing a carry bit from this output stage back to the network, by retaining a most significant (carry) bit for use with a subsequent calculation output of the network.

In another arrangement, an objective is to enable the network to commence a subsequent calculation with a new set of addends prior to completion of the previous calculation. The network of adders may be configured so that the output of the previous calculation is fed back to the network at an intermediate level between its highest (input) level and its lowest (output) level.

According to one aspect, the present invention provides an adder circuit for summing a plurality of addends from multi-bit words comprising:

a network of n-input carry-save adder circuits each having a first number of sum outputs and a second number of carry outputs, the adder circuits being arranged in a plurality of columns, each column corresponding to a predetermined bit position in the sum, and being arranged in a plurality of levels, the first level receiving a number of addends from corresponding bit positions of selected ones of the plurality of words and the lower levels each receiving addends from one or more of (i) corresponding bit positions of other selected ones of the plurality of words, (ii) sum outputs from a higher level adder circuit in the same column, and (iii) carry outputs from a higher level adder circuit in a column corresponding to a less significant bit position, wherein the number of n-input adders in each column varies according to the bit position.

According to another aspect, the present invention provides an adder circuit comprising:

an input for receiving a plurality of addends;

first summation means for summing a plurality of addends to produce an output comprising a high order part and a first and second low order part;

a first feedback line for coupling the first high order part to a lower order position at said input, for a subsequent calculation; and an output stage including second summation means for summing the first and second low order parts to provide a first word output and a feedback register for retaining a carry bit from said second summation means and for providing said carry bit as input to said second summation means during a subsequent calculation.

According to another aspect, the present invention provides a pipelined adder circuit for summing a plurality of addends from multi-bit words comprising:

first summation means comprising a network of carry-save adder circuits, the adder circuits being arranged in a plurality of columns, each column corresponding to a predetermined bit position in the sum, and being arranged in a plurality of levels, the first level coupled for receiving a number of addends from corresponding bit positions of selected ones of the plurality of words and the lower levels coupled for receiving addends from one or more of (i) corresponding bit positions of other selected ones of the plurality of words, (ii) sum outputs from a higher level adder circuit in the same column, and (iii) carry outputs from a higher level adder circuit in a column corresponding to a less significant bit position, a first feedback line for coupling a first plurality of more significant bit outputs of the lowest level adder circuits to a corresponding number of less significant bit inputs of an intermediate level of adder circuits for a subsequent calculation, the intermediate level being between said first and lowest level adder circuits.

Embodiments of the present invention will now be described by way of example and with reference to the accompanying drawings in which.

To calculate the product $X \cdot Y + Z \mod N$ where X, Y and Z are long-integer variables, eg. of the order of 1024 or 2048 bit length, the long-integer variables X, Y and Z are split into smaller "words" of, for example 32 or 64 bits in length.

First, X and Z are split up into n words, generally each of length k, such that:

$$X = x_{n-1}B_x^{n-1} + x_{n-2}B_x^{n-2} + \ldots + x_0, \text{ and}$$

$$Z = Z_{n-1}B_x^{n-1} + z_{n-2}B_x^{n-2} + \ldots + z_0$$

where $B_x = 2^k$. In one example, k=32, and in another example k=64.

In this manner, X and Z are fragmented into a plurality of words each of length k bits.

Then, the result R can be calculated as follows:

$$R = ((((\underbrace{x_{n-1}Y + z_{n-1} \mod N}_{R_0})B_x + x_{n-2}Y + z_{n-2}) \mod N)B_x + \ldots x_0Y + z_0) \mod N$$

with $R_1$ and $R_{n-1}$ bracketing successive stages.

Thus, $R_j = (x_{n-j-1}Y + z_{n-j-1} + R_{j-1}B_x) \mod N$.

First, we multiply $x_{n-1}$ by the complete Y and add $z_{n-1}$; then we calculate the modulo N reduction. The result is $R_0$.

Next, we multiply $x_{n-2}$ by the complete Y, add $Z_{n-2}$ and $R_0 \cdot B_x$ to the result and calculate the modulo N reduction. The result is $R_1$.

Next, we multiply $x_{n-3}$ by the complete Y, add $z_{n-3}$ and $R_1 \cdot B_x$ to the result and calculate the modulo N reduction. The result is $R_2$.

This procedure is repeated until we have used all words of X, $x_0$ being the last word of X to be processed, to obtain the final result $R = R_{n-1}$.

However, a multiplier for Y being 1024-bits long is undesirable from a practical viewpoint. Therefore, we also break down Y, and thus $R_j$, into smaller "words" of, for example, 32 bits or 16 bits in length.

Therefore, the basic multiplication $R_j = (x_{n-j-1}Y + z_{n-j-1} + R_{j-1}B_x) \mod N$, is also fragmented.

We split Y and $R_j$ into p words of m bits in length, ie. $B_y = 2^m$:

$$Y = y_{p-1}B_y^{p-1} + y_{p-2}B_y^{p-2} + \ldots + y_0$$

$$R_j = r_{j,p-1}B_y^{p-1} + r_{j,p-2}B_y^{p-2} + \ldots + r_{j,0}$$

For simplicity, we first assume that the lengths of X and Y are the same, and that the size of the X and Y words are the same, so that p=n and m=k. Later, we will show what has to be changed when this is not the case.

In this manner, X and Y are fragmented into n words each of length k bits. Then, $$R_j = \underbrace{x_{n-j-1}y_0 + z_{n-j-1}}_{Bc_{j,0}+r_{j,0}} + \underbrace{(x_{n-j-1}y_1 + r_{j-1,0})B}_{Bc_{j,1}+r_{j,1}} + \underbrace{(x_{n-j-1}y_2 + r_{j-1,1})B^2}_{Bc_{j,2}+r_{j,2}} + \ldots + \underbrace{(x_{n-j-1}y_{n-1} + r_{j-1,n-2})B^{n-1} + r_{j-1,n-1})B^n}_{Bc_{j,n-1}+r_{j,n-1}}$$

For the calculation of $R_j$, we perform the following operations:

First, we multiply $X_{n-j-1}$ by $y_0$, add $r_{j-1,-1} = z_{n-j-1}$ and split the result into two equal parts: the lower part $r_{j,0}$ (m-bits) and the higher part $c_{j,0}$ (k-bits): $B \cdot c_{j,0} + r_{j,0} = x_{n-j-1} \cdot y_0 + r_{j-1,-1} \cdot r_{j,0}$ is saved as part of the outcome.

Next, we multiply $x_{n-j-1}$ by $y_1$ and add the previous carry word $c_{j,0}$. Moreover, we add $z_0 = r_{j-1,0}$ too. The result is again split into two equal parts: the lower part $r_{j,1}$ and the higher part $c_{j,1}$: $B \cdot c_{j,1} + r_{j,1} = x_{n-j-1} \cdot y_1 + c_{j,0} + r_{j-1,0} r_{j,1}$ is saved as part of the outcome.

Next, we multiply $x_{n-j-1}$ by $y_2$ and add the previous carry word $c_{j,1}$. Moreover, we add $z_1 = r_{j-1,1}$ too. The result is again split into two equal parts: the lower part $r_{j,2}$ and the higher part $c_{j,2}$: $B \cdot c_{j,2} + r_{j,2} = x_{n-j-1} \cdot y_2 + c_{j,1} + r_{j-1,1} \cdot r_{j,2}$ is saved as part of the outcome.

This procedure is repeated until we perform the last multiplication, by $y_{n-1}$, ie. we multiply $x_{n-j-1}$ by $y_{n-1}$ and add the previous carry word $c_{j,n-2}$. Moreover, we add $z_{n-2} = r_{j-1,n-2}$ too. The result is again split into 2 parts, respectively of k- and m-bits in length: the lower part $r_{j,n-1}$ and the higher part $c_{j,n-1}$: $B_y \cdot c_{j,n-1} + r_{j,n-1} = x_{n-j-1} \cdot y_{n-1} + c_{j,n-2} + r_{j-1,n-2} \cdot r_{j,n-1}$ is saved as part of the outcome.

The last step is the addition of $c_{j,n-1}$ and $z_{n-1}$: $r_{j,n} = c_{j,n-1} + r_{j-1,n-1} \cdot r_{j,n}$ which is saved as part of the outcome.

Now $R_j$ is complete and is larger than the Y variable from which it was derived by the length of one word of X. The size of $R_j$ is preferably reduced by one word in a modulo N reduction, and the reduced result is then used as $R_j$ during the calculation of the subsequent $R_{j+1}$.

The above calculation described the general procedure where the length of the X words (k) is the same as the length of the y words (m), ie. $B_x=B_y$.

The X words may be different in length than the Y words. For example, if k/m>1, k=64 and m=16, then $B_x=B_y^4$, then:

1. The addition of z is done during the first k/m (=4, in the example) multiplications and the addition of $R_j$ starts thereafter.

2. The carry word $c_{j,i}$ is k/m (=4) times larger (4 m bits in length) than the result $r_{j,i}$ (m bits in length).

3. The last step consists of the addition of the carry word and the remaining part of $R_j$, which are both 4 m bits wide. This addition might be done by the same multiplier by choosing y=0 in k/m steps, where in each step words of m bits are added.

Thus, in the basic operation, omitting all indices:

$$B \cdot c + r = x \cdot y + c + z$$

During the first operation, c=0, z consists of k/m words of Z followed by all words of r. During the last k/m operations, y=0. x is kept constant for the complete set of operations for each $R_j$.

The same multiplier as performs the x-y multiplication can be used for modulo N reduction. After a complete set of multiplications by a word of X, ie. x, the result $R_j$ is enlarged by one k-bit word. It must then be reduced by k-bits by modulo N reduction to retrieve the original length prior to computation of the next $R_j$.

There are several possible algorithms for modulo reduction (eg. Quisquater, Barret, Montgomery, etc), but they all use the multiplication of the form:

$$R_j = X_{red} \cdot N + R_j$$

where $X_{red}$ (having a size of k bits) times the modulus, N is added to the result. Alternatively, $X_{red}$ is subtracted by using the two's complement N' instead of N. The methods differ in the way that the factor $X_{red}$ is calculated. For the Montgomery reduction, the result must also be divided by $B_x$, ie. the first word, being all zero) is omitted.

The same basic operation can be used for the reduction:

$$B \cdot c + r = x \cdot y + c + z$$

with $B=B_y$, $r=r_{j,i}$, $x=X_{red}$, $y=N_i$ and $z=r_{j,i}$.

The above multiplication operations can be carried out in a number of possible multipliers. However, an array multiplier is a conventional way of implementing such a multiplier. An example is shown in FIG. 1.

The exemplary array multiplier 10 is a 64 by 16-bit multiplier, but other bit configurations can readily be used. The array multiplier 10 calculates each term in the expression $R_j$, in the form $B \cdot c + r = x \cdot y + c + z$. x and c have a width of 64 bits, y, z and r have a width of 16 bits. c, both as input and output, consists in fact of two terms, Cc and Cs.

Figure 1:
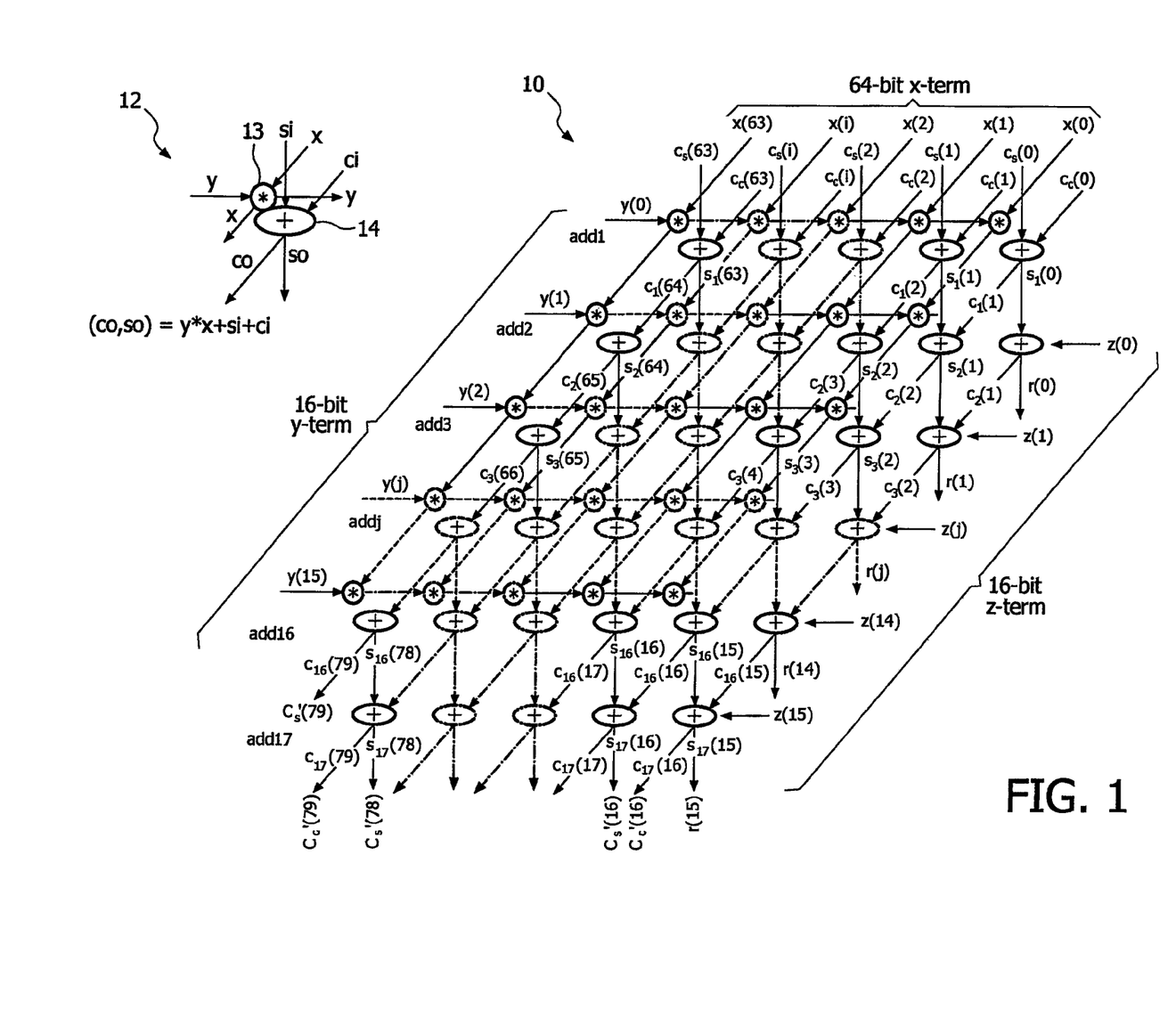
FIG. 1 shows an array multiplier suitable for carrying out the multiplication operations, $B \cdot c + r = x \cdot y + c + z$ where x and c have a width of 64 bits, while y, z and r have a width of 16 bits.

The basic element 12 of the array multiplier is shown inset in FIG. 1 and includes a multiplier 13 receiving inputs x and y, and an adder 14 receiving product terms x·y, carry and sum inputs $s_i$ and $c_i$ to produce carry and sum outputs $c_o$ and $s_o$ therefrom.

The array multiplier 10 consists of seventeen 'layers' or 'levels', 'add1', 'add2', . . . 'add17'. The first sixteen layers add1 . . . add16 perform the multiplication and addition. The last layer, add17, and the right-most elements in each layer) perform only additions. The outputs are 16-bit r(15:0) and a 63-bit carry term Cc'(79:16) and a 63-bit sum term Cs'(79:

16). The sum of the carry term Cc' and the sum term Cs' is the carry term c in the calculation:

$$B \cdot c + r = x \cdot y + c + z.$$

In fact, this term is never calculated. Instead, the calculation:

$$B \cdot (c' + s') + r = x \cdot y + c' + s' + z$$

is performed. The basic element 12 of the array multiplier 10 performs the bit calculation $(c_o, s_o) = y*x + c_i + s_i$. The adding of z is done by the rightmost adder of every layer except the first one. The seventeenth layer consists only of adders, which is necessary for the addition of r(15). A drawback with the use of this implementation of array multiplier is the low speed at which it can operate, as a result of cumulative delays from seventeen layers of logic.

Figure 2:
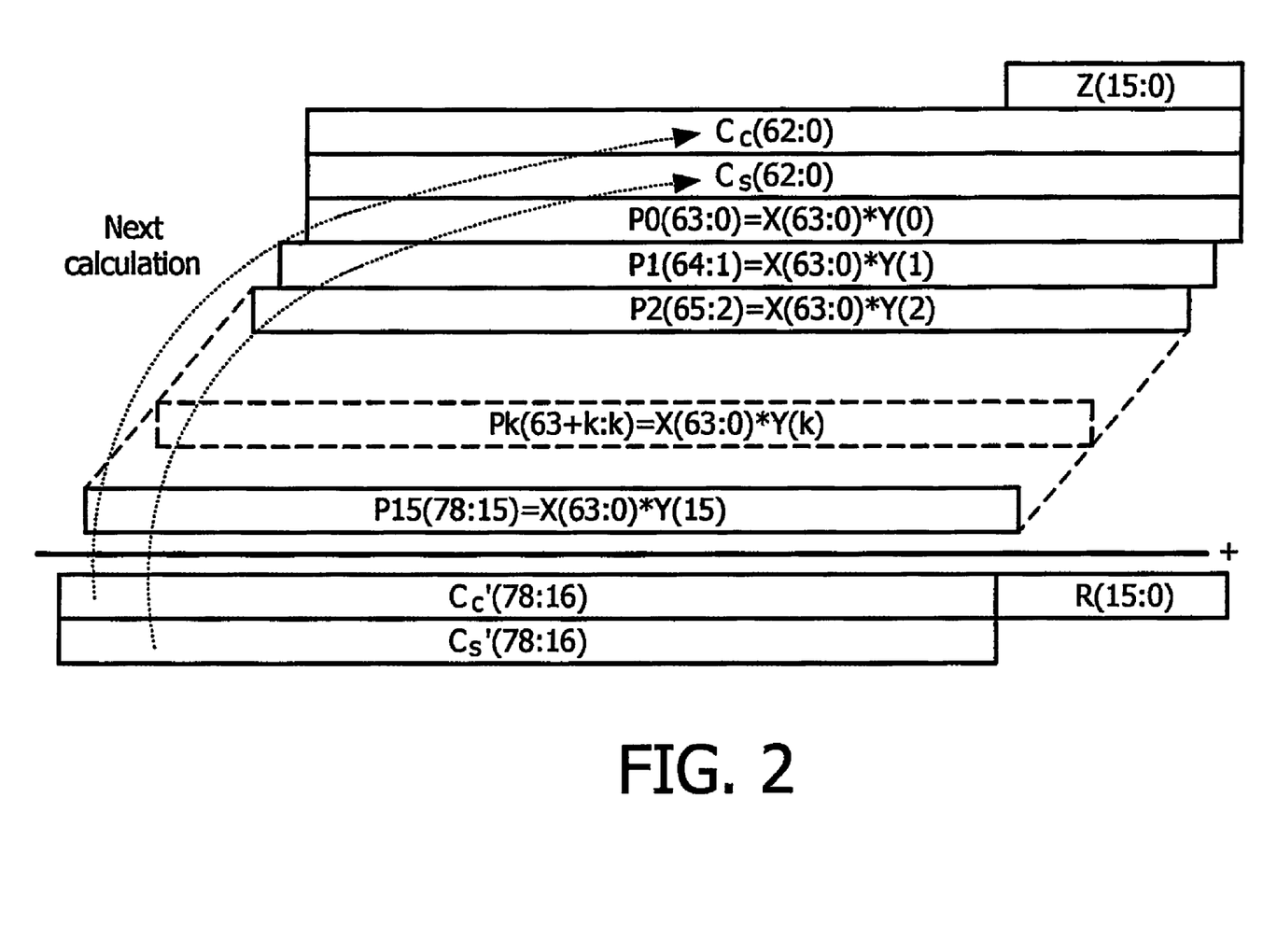
FIG. 2 shows a bit alignment of words to be added in a pipelined multiplier performing the calculation $R_j = x_{n-j-1} y_0 + z_{n-j-1} + (x_{n-j-1} y_1 + r_{j-1,0}) B_y + (x_{n-j-1} y_2 + r_{j-1,1}) B_y^2 + \ldots + (x_{n-j-1} y_{n-1} + r_{j-1,n-2}) B_y^{n-1} + r_{j-1,n-1}) B_y^n$, where each of the x·y word products is denoted by $P_j$, split into a number of products, e.g. $P_0 \ldots P_{15}$ together with a sum term denoted by Z.

Therefore, it is advantageous to use a pipelined multiplier in which the processing of the various stages can be overlapped to reduce the computation time. With reference to FIG. 2, the various addends required during the multiplication process are shown schematically. For a 64 by 16-bit multiplier, the process requires the addition of: (i) 16 product terms $P_0, P_1, \ldots P_{15}$ with $P_j = X(63:0) * Y(j)$; (ii) a 16-bit Z term Z(15:0); (iii) a 63-bit carry term Cc(62:0) and (iv) a 63-bit sum term Cs(62:0).

The result $R_j$(15:0) is output and the intermediate terms Cc'(78:16), Cs'(78:16) are carried into the calculation of the next term $R_{j+1}$.

Figure 3:
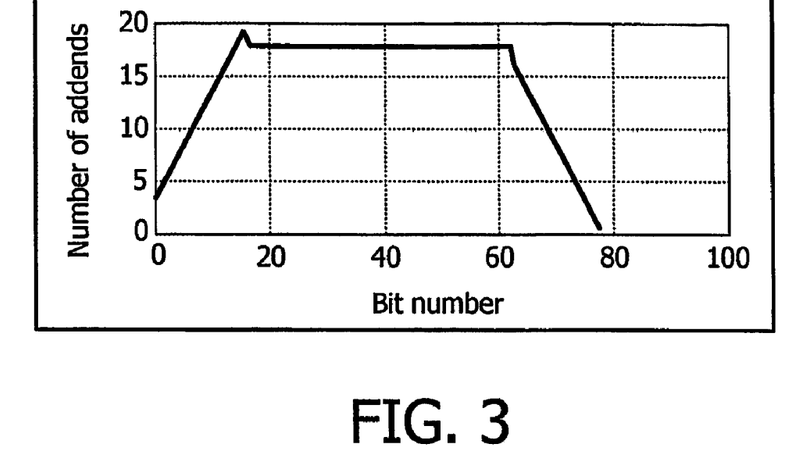
FIG. 3 is a graph showing the number of addends, per bit position, for the summation of words of FIG. 2.

FIG. 3 gives the number of addends per bit position. From bit position 0 through to bit position 15, the number of addends increases linearly from 4 up to 19 as more P terms are included. Then it decreases by 1 for bit 16, since there are no more z-bits. The number of addends then remains constant at 18 right through to bit 62 when the carry and sum terms Cc and Cs drop out. Thus, a reduction in the number of addends by 2 to 16 occurs for bit position 63. Finally, from bit position 63 on up to bit position 78, the number of addends decreases linearly from 16 down to 1 as each successively higher P term drops out.

Figure 4:
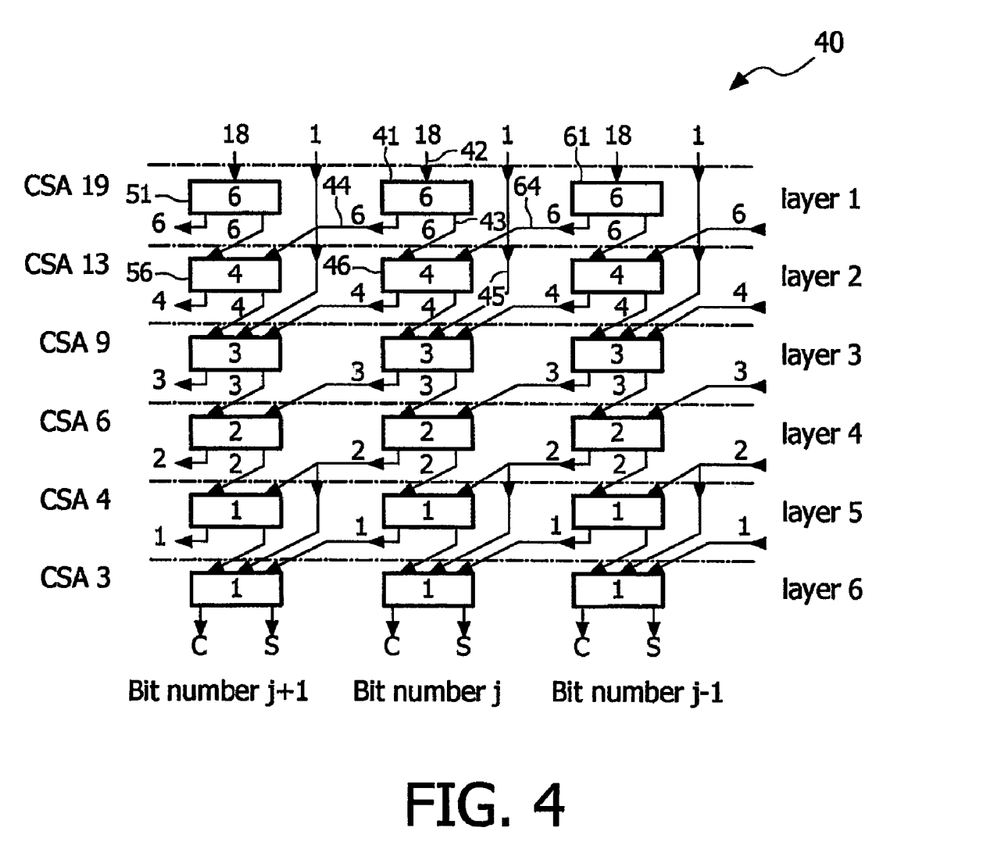
FIG. 4 shows a fragment of a conventional Wallace tree structure suitable for implementing the pipelined summation of words of FIG. 2.

A Wallace tree is a conventional way of configuring an array of carry-save adders for the performance of the addition operations for a large number of addends, using an optimised number of levels. FIG. 4 shows a fragment of such a Wallace tree 40.

Each adder adds three inputs and has two outputs: a carry and a sum. A Wallace tree assumes that the number of addends per bit position is constant, and FIG. 4 shows the configuration of tree 40 that would be appropriate for implementing the required additions indicated by FIG. 3. In this case, the tree is configured for 19 addends per bit position, since this maximum occurs for bit position 15.

At the first level, indicated as 'layer 1' on the drawing, there are six carry-save adders 41 for each bit position, eg. bit position j as shown. These six carry-save adders provide a total of eighteen inputs 42, six sum outputs 43 and six carry outputs 44. Furthermore, there is one additional input 45, which is added into level 3 ('layer 3'). This gives the required total of nineteen inputs.

The six sum outputs 43 are added in next level 2 by carry-save adders 46. The six carry outputs 44 are added in the next level 2 of the tree but in the carry-save adders 56 of the next bit position to the left indicated as j+1. The carry-save adders 61 of the first level for the preceding bit position j−1 also provide six carry outputs 64 which are provided to the adders 46 of level 2 for bit position j. The conventional Wallace tree assumes that the number of carry inputs (eg. 43, 44) equals the number of carry outputs, which is always the case when the number of inputs for each bit position at level 1 is the same.

Such a Wallace tree gives the minimum number of levels for a given number of addends according to the table below:

| Number of addends | Number of levels |
|---|---|
| 1, 2, 3 | 1 |
| 4 | 2 |
| 5, 6 | 3 |
| 7, 8, 9 | 4 |
| 10-13 | 5 |
| 14-19 | 6 |

It has been recognised that particularly—though not exclusively—for the computations required for the expression R=X*Y+Z mod N discussed above, the number of adders required for a given number of addends can be reduced, particularly when the number of addends is variable through the calculation.

Figure 5:
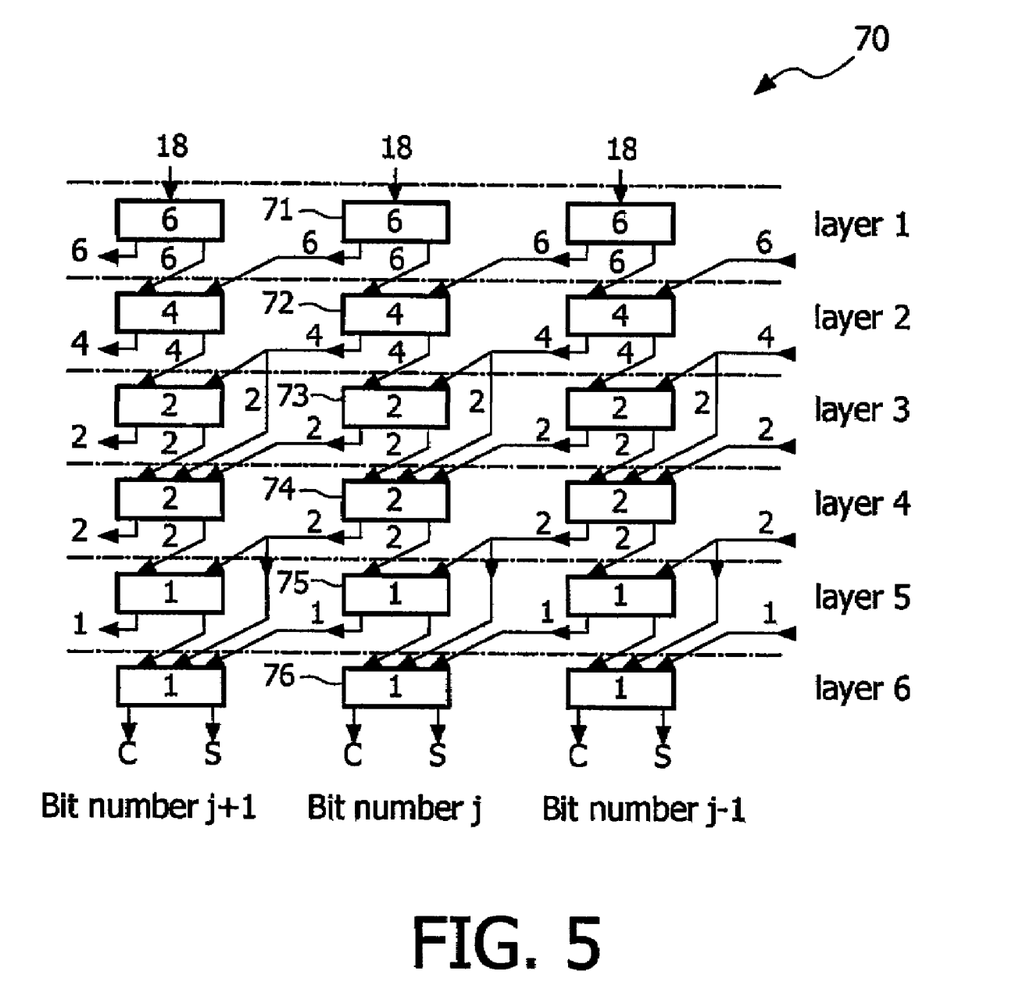
FIG. 5 shows a fragment of an adaptive tree structure suitable for implementing the pipelined summation of words of FIG. 2.
Figure 8:
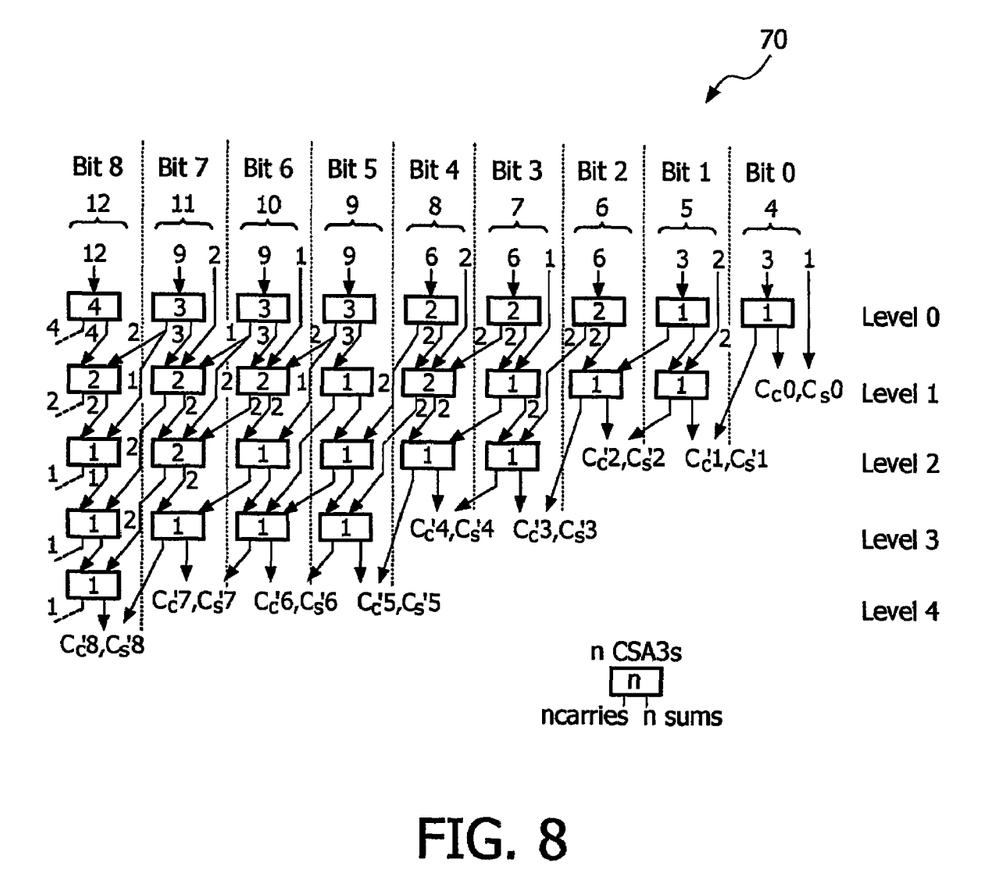
FIG. 8 shows a further fragment of the adaptive tree structure of FIG. 5, suitable for implementing the pipelined summation of words of FIG. 2.

FIG. 5 illustrates a section or fragment of the basic structure of an exemplary 'adaptive tree' or network 70 according to the present invention, for each of bit number positions j+1, j, and j−1, each bit position corresponding to a column in the tree. In the fragment of FIG. 5, the number of addends is 18 in each bit position (column). This basic structure is used for all bit positions, but the number of carry-save adders at each level and in each bit position is determined independently according to the number of addends required at that respective bit position. FIG. 8 shows a further section of the adaptive tree 70, specifically for bit positions 0 through to 8, respectively requiring 4 through to 12 addends (see FIG. 3). The adaptive tree therefore comprises a tree structure of adders which is structured to minimise or reduce the number of adders required where there are variable numbers of input bits for the respective input bit positions.

The determination of the structure of the adaptive tree or network is established according to the following rules.

At the first level, the number of carry-save adders 71 in a given bit position is set to the number of input addends divided by three and rounded down to the nearest whole number. For example, for sixteen inputs, five adders are required. For eighteen inputs as illustrated in FIG. 5, position j, six adders 71 are required.

At each of the subsequent levels, the number of adders for the given bit position is determined according to the expression:

(number of adders for bit position $j$ at level $n$)={(number of sum outputs from level $n-1$ in bit position $j$)+(number of unconnected inputs of level $n-1$ in bit position $j$)+(number of carries of level $n-1$ in bit position $j-1$)} divided by 3 and rounded down to the nearest integer.

Thus, referring specifically to FIG. 5, at an intermediate portion of the tree 70 requiring eighteen inputs for bit position j, at level 1, the number of adders 71 is six. At level 2, according to the formulation above, the number of adders 72 is INT{(6+0+6)/3}=4. At level 3, the number of adders 73 is INT{(4+0+4)/3}=2. At level 4, the number of adders 74 is INT{(2+2+2)/3}=2. At level 5, the number of adders 75 is INT{(2+0+2)/3}=1. Finally, for level 6, the number of adders 76 is INT{(1+1+1)/3}=1. It will be noted that for each of the bit positions j+1, j and j−1, for eighteen addends, there is a saving of one carry-save adder at level 3 in each bit position.

Referring specifically to FIG. 8, at one end of the tree 70 further savings are made, because the number of carries from the right is smaller—because of the increasing number input bits—than in the Wallace tree case. For example, at bit position 7, eleven addends are present. A conventional Wallace tree would suggest five levels. In fact, in this position, four levels, respectively having three, two, two and one adder(s) are required.

In some cases the number of levels can sometimes be reduced still further by the addition of a two-input carry-save adder at strategic positions within the network. First, the design is implemented using only three-input carry-save adders to form a network 70 according to the strategy defined above. To identify the strategic positions in which to insert a two-input carry save adder, it is necessary to identify, in each level ('$L_n$') and bit position ('$B_j$'), locations where the number of inputs to that bit position $B_j$ and level $L_n$ exceeds a minimum number, eg. two. Where it does, a two-input carry-save adder is inserted at a level (eg. $L_{n-1}$ or $L_{n-2}$, etc) above the location, at which level there are two unconnected addends. This effectively moves one input to the next higher order bit position $B_{j+1}$. This in turn may result in a consequential exceeding of the allowed number of outputs for the next bit position and therefore the procedure must be repeated a number of times until the number of inputs for all bit positions does not exceed the allowed number.

Figure 9:
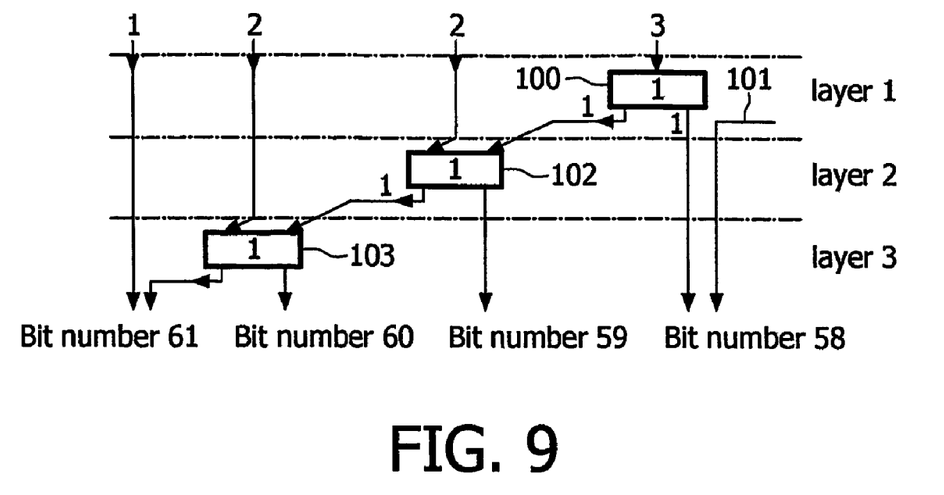
FIG. 9 shows a portion of an adaptive tree structure according to FIG. 5.

For example, referring specifically to FIG. 9, there may be a decreasing number of inputs for the higher order bits resulting in a higher than necessary number of layers. The maximum number of inputs per bit position is three, so one level of adders should be sufficient. In FIG. 9, we have three inputs for the adder 100 of bit position 58 and a carry output 101 from an adder in bit position 57 (not shown). We have two inputs for each of the adders 102, 103 of bit positions 59 and 60 respectively, and one input for bit position 61. For bit position 59, we have three (instead of the desired two) outputs from level 1: one carry output from bit position 58 and two unconnected word inputs. Three levels (labelled layer 1, layer 2 and layer 3) are required because of the carry 101 from bit position 58 to 59 and in the same way from bit 59 to 60. This gives two additional layers.

Figure 10:
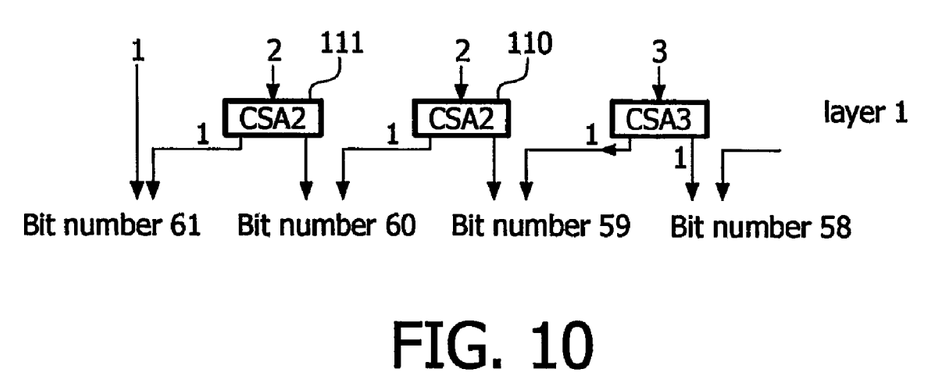
FIG. 10 shows the insertion of a number of two-input carry-save adders for insertion into the adaptive tree structure of FIG. 9.

With reference to FIG. 10, we can mitigate this situation by using extra two-input, two-output adders 110, 111 (labelled as 'CSA2', in contrast to the three-input, two-output carry save adders, 'CSA3'). Such adders do not reduce the number of inputs in total, but they do for that bit position by one. The CSA2 adder 110 increases the number of inputs for the next higher bit position 60 from two to three so the problem is moved to bit position 60 instead of bit position 59. However, CSA2 adder 111 is also inserted which reduced the number of inputs to level 1, bit position 60 from three to two. The consequent increase in the number of inputs at bit position 61 from one to two does not matter.

In principle, it has been recognised that strategic handling of pairs of addends with two-input adders at higher levels in a particular bit position can result in a further decrease in the number of levels. In other words, locally increasing the summation capacity with two input adders in one or more adjacent higher order positions can consequently reduce summation capacity required at lower levels, ultimately reducing the number of levels, without requiring an additional three-input adder.

This solution increases the number of addends for a left neighbour which might, as a result, get too many inputs. If so, a number of two input adders may need to be inserted in a level until there is a bit position with a sufficiently low number of inputs as shown by bit position 61.

In a general sense, a procedure for inserting additional two-input carry-save adders may be defined as the following steps. Firstly, for a given number of levels, find a first location in the network having a bit position $B_j$ and level $L_n$ where the number of outputs at that first location is greater than two (eg. three, instead of two) and where at some higher level there are two unconnected addends. Secondly, in respect of that first location, insert a two-input carry-save adder at a second location having the same bit position $B_j$ but having a level (eg. $L_{n-1}$, $L_{n-2}$, etc) above the first location, at which location there are two unconnected addends.

The procedure may need to be repeated a number of times until the number of inputs for all bit positions does not exceed the allowed number.

Figure 6:
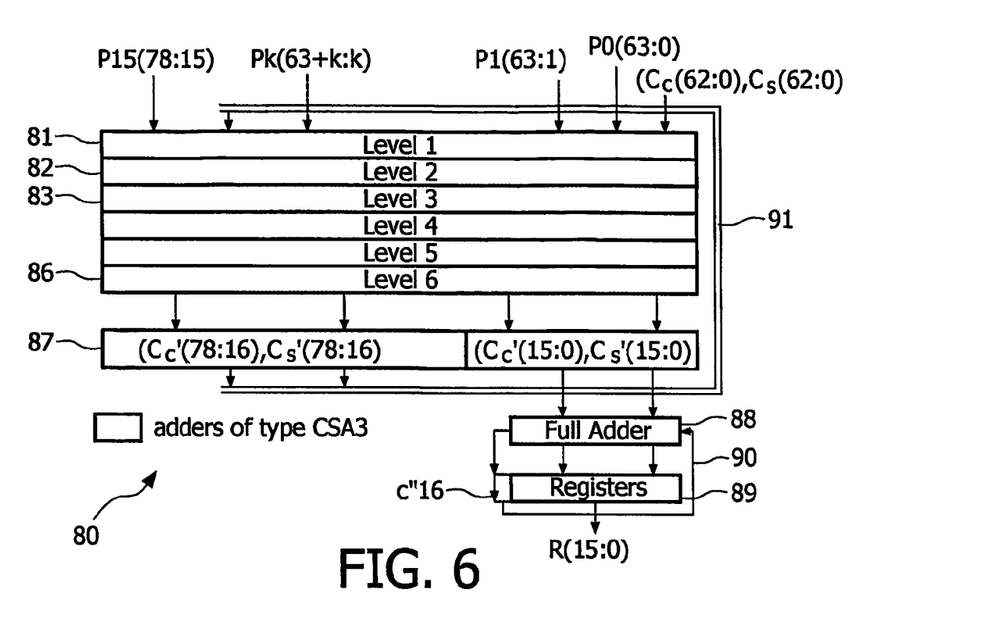
FIG. 6 shows a schematic block diagram of an unpipelined adder suitable for implementing the summation of words of FIG. 2.

With reference to FIG. 6, the adaptive tree may be used in an unpipelined adder configuration 80. In this arrangement, the adaptive tree has a maximum of six levels 81, 82 . . . 86 for summing all the addends of FIG. 2. The adder sums all sixteen products $P_0$ . . . $P_{15}$, Z and the feed back carry term Cc(62:0) and sum term Cs(62:0) using an adaptive tree of six levels. The output 87 of the tree is registered, such that the higher order part of final carry term Cc'(78:16) and the higher order part of final sum term Cs'(78:16) output are fed back on feedback line 91 and shifted to bit positions (62:0) as input for the next calculation. The lower order part of carry term Cc' (15:0) and sum term Cs'(15:0) are summed by an additional full adder 88 and saved to register 89, which is the term 'r' in the formula B·(c'+s')+r=x·y+(c'+s')+z.

This later addition of the lower order parts of carry and sum terms Cc'(15:0) and Cs'(15:0) itself generates a further single bit carry term, identified in FIG. 6 as $c''_{16}$. This single bit carry term is fed back for inclusion in the next summation by full adder 88, as indicated by the feedback line 90.

Thus, in a general sense, the additional full adder 88 and register 89 exemplify an output stage which add the sum and carry terms to provide a first word output of a final result, and to retain a carry bit $c''_{16}$ to be used as input for a subsequent stage of the calculation in which the main adder array generates a further, higher order sum and carry term for addition by the output stage.

Alternatively, the carry term $c''_{16}$ could be fed back to level 1, bit 0 of the adaptive tree as shown at 81, since it has the same weight as Cc'(16) and Cs'(16). A disadvantage of this technique is that the adaptive tree must wait for the $c''_{16}$ output of the full adder 88 before commencing a subsequent calculation. Therefore it is preferable to use the full adder 88 to add the $c''_{16}$ term.

The carry bit $c''_{16}$ is cleared, like Cc' and Cs', at the beginning of each new multiplication.

Figure 7:
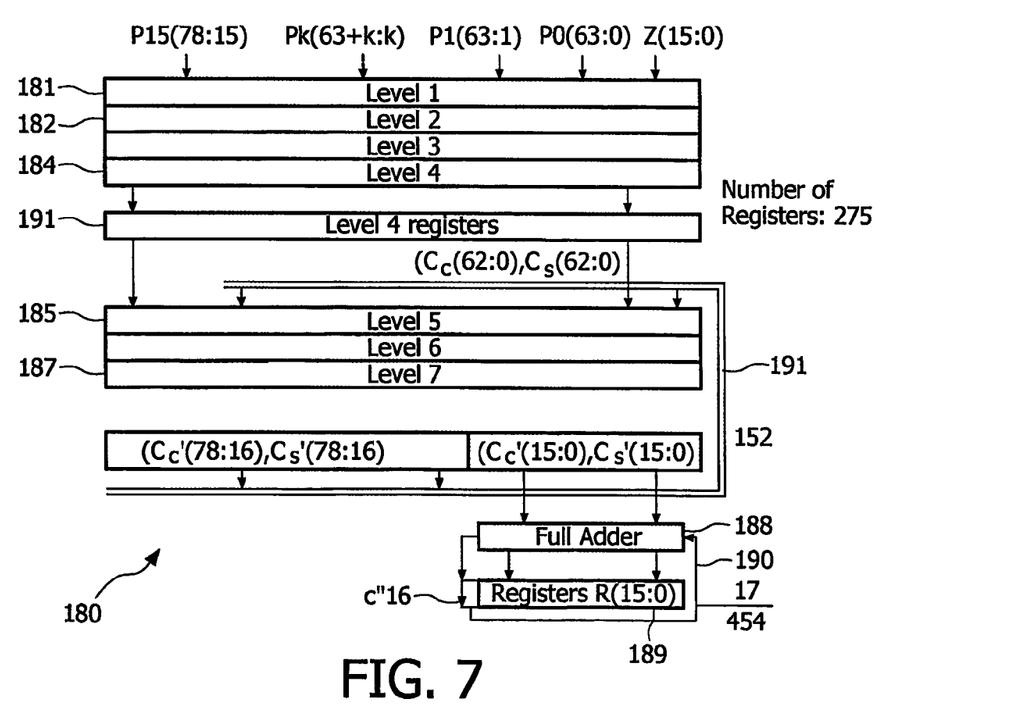
FIG. 7 shows a schematic block diagram of a pipelined adder based on the structure of the adder of FIG. 6.

In a further arrangement, as shown in FIG. 7, the adaptive tree 180 can be given a pipelined configuration, having a number of levels 181 . . . 187. In this case, it is generally necessary to feedback the higher order part of the carry Cc' (78:16) and sum Cs'(78:16) to a preceding level (ie. an 'intermediate' level 185) instead of the first level 181. Thus, in the specific arrangement shown in FIG. 7, rather than wait for the higher order part of final carry term Cc'(78:16) and the higher order part of final sum term Cs'(78:16) output from the last level 187 to be fed back to level 1 prior to commencement of the next calculation, these terms can be added in at level 5, as shown. Although this arrangement increases the number of levels by one, to 7, the delay is reduced from a six level delay as in the arrangement of FIG. 6 to a four level delay as in the arrangement of FIG. 7.

In this configuration, in a general sense the feedback line 191 couples the more significant bit output of the adder circuits to a corresponding number of less significant bit inputs of an intermediate level of adder circuits. It may be necessary to provide an intermediate level register 191 for temporarily holding the summation results from the first four levels 181 . . . 184.

This increases the speed of operation by a factor of 1.5, at the cost of a significant increase in hardware. In the example given, an additional 275 registers are required to service the additional level.

Another advantage of the adaptive tree occurs for pipelined versions. In FIG. 7, most of the adders of the lower order bit numbers, where at most four levels are required, are placed in the first four layers, thereby reducing the number of registers. By contrast, the Wallace Tree requires these adders to be placed in the lower layers. This therefore requires far more level 4 registers, since the Wallace tree does not reduce the number of inputs in the upper levels for the lower bit numbers.

The arrangement of FIG. 7 may also include the output stage 188 . . . 190 as described in connection with the output stage 88 . . . 90 of the arrangement of FIG. 6.

Other embodiments are intentionally within the scope of the accompanying claims.

The invention claimed is:

1. An adder circuit for summing a plurality of addends from multi-bit words comprising:
   a network of n-input carry-save adder circuits each having a first number of sum outputs and a second number of carry outputs, the adder circuits being arranged in a plurality of columns each column corresponding to a predetermined bit position in the sum, and being arranged in a plurality of levels,
   the first level receiving a number of addends from corresponding bit positions of selected ones of the plurality of words and the lower levels each receiving addends from one or more of (i) corresponding bit positions of other selected ones of the plurality of words, (ii) sum outputs from a higher level adder circuit in the same column, and (iii) carry outputs from a higher level adder circuit in a column corresponding to a less significant bit position, at least one of the levels receiving addends corresponding to a calculation involving another one of the words,
   wherein the number of n-input adders in each column varies according to the bit position.

2. The circuit of claim 1 in which the number of n-input adders in each column is specifically adapted to the number of addends required for that column.

3. The circuit of claim 1 in which the number of n-input adders in each bit position of the first level does not exceed the integer part of the number of addends divided by n.

4. The circuit of claim 1 in which the number of n-input adders in each bit position of the lower levels does not exceed the integer part of:
   the total of: (a) the number of sum outputs of the n-input adders in a higher level and the same column, (b) the number of unconnected inputs from a higher level and the same column, and (c) the number of carry outputs from a higher level and a column corresponding to a less significant bit position, which total is divided by n.

5. The circuit of claim 4 in which the number of unconnected inputs is that of the immediate higher level.

6. The circuit of claim 4 in which the number of sum outputs is that of the immediate higher level.

7. The circuit of claim 4 in which the number of carry outputs is that of the immediate higher level.

8. The circuit of claim 1 in which n is three, and the first number of sum outputs is less than three and equal to the second number of carry outputs.

9. The circuit of claim 1 further including means for delivering each one of the plurality of multi-bit words to the network of n-input adders such that the number of addends per bit position varies as a function of bit position.

10. The circuit of claim 1 further including one or more input adders placed at selected positions within the network.

11. The circuit of claim 10 in which the selected positions are determined so as to reduce the number of levels required to sum the plurality of addends.

12. The circuit of claim 11 in which the n-input adders are three-input adders, the input adders are two-input adders, and in which each selected position is determined according to an identified bit position and level where the number of outputs would otherwise be greater than two, the selected position being at a level above the identified position and in the same bit position.

13. The circuit of claim 1, further including an integer-splitting block that splits each of at least two integers into the multi-bit words.

14. The circuit of claim 1, further including an integer-splitting block that splits each of at least two integers into the multi-bit words for generating intermediate results used in executing cryptographic functions, and
wherein, for at least one of the multi-bit words, at least one of the lower levels receives an addend corresponding to a bit position from a different one of the multi-bit words.

15. The circuit of claim 1, further including a feedback circuit configured to provide the addends corresponding to a calculation involving another one of the words.

16. The circuit of claim 1, further including a feedback circuit configured to provide a feedback output from one of the levels for one of the words, to a previous level for a subsequent calculation involving another one of the words.

17. The circuit of claim 1, wherein the network is configured to concurrently process at least two words, and
further including a feedback circuit configured to provide a feedback output from one of the levels for a calculation involving one of the words, to an intermediate level below a highest level for use as an intermediate input to a subsequent calculation involving a different one of the words.

18. An adder circuit comprising:
an input for receiving a plurality of addends;
first summation means for summing a plurality of addends to produce an output comprising a high order part and a first and second low order part;
a first feedback line for coupling the first high order part to a lower order position at said input, for a subsequent calculation;
an output stage including second summation means for summing the first and second low order parts to provide a first word output and a feedback register for retaining a carry bit from said second summation means and for providing said carry bit as input to said second summation means during a subsequent calculation.

19. The adder circuit of claim 18 in which the high order part comprises a sum term and a carry term fed back to a subsequent calculation.

20. The adder circuit of claim 18 in which the carry bit is used at the end of a subsequent calculation of the first and second low order parts that are calculated by the first summation means.

21. The adder circuit of claim 18 for summing a plurality of addends from multi-bit words in which:
the first summation means comprises a network of carry-save adder circuits each having a number of inputs, a number of sum outputs and a number of carry outputs,
the adder circuits being arranged in a plurality of columns, each column corresponding to a predetermined bit position in the sum, and being arranged in a plurality of levels,
the first level coupled for receiving a number of addends from corresponding bit positions of selected ones of the plurality of words and the lower levels coupled for receiving addends from one or more of (i) corresponding bit positions of other selected ones of the plurality of words, (ii) sum outputs from a higher level adder circuit in the same column, and (iii) carry outputs from a higher level adder circuit in a column corresponding to a less significant bit position,
the first feedback line coupling a first plurality of more significant bit outputs of the lowest level Wadder circuits, as said first high order part, to a corresponding number of less significant bit inputs of said first level of adder circuits at said lower order position.

22. The adder circuit of claim 18 in which the high order part comprises a high order carry term output and a high order sum term output, and in which the first low order part comprises a low order carry term output and the second low order part comprises a low order sum term output.

23. A pipelined adder circuit for summing a plurality of addends from multi-bit words comprising:
first summation means comprising a network of carry-save adder circuits, the adder circuits being arranged in a plurality of columns, each column corresponding to a predetermined bit position in the sum, and being arranged in a plurality of levels the first level coupled for
receiving a number of addends from corresponding bit positions of selected ones of the plurality of words and the lower levels coupled for receiving addends from one or more of (i) corresponding bit positions of other selected ones of the plurality of words, (ii) sum outputs from a higher level adder circuit in the same column, and (iii) carry outputs from a higher level adder circuit in a column corresponding to a less significant bit position,
a first feedback line for coupling a first plurality of more significant bit outputs of the lowest level adder circuits to a corresponding number of less significant bit inputs of an intermediate level of adder circuits for a subsequent calculation, the intermediate level being between said first and lowest level adder circuits.

24. The pipelined adder circuit of claim 23 further including an output stage including second summation means for summing first and second low order parts respectively comprising a second and a third plurality of less significant bit outputs of the lowest level adder circuits to provide a first word output and a feedback register for retaining a carry bit from said second summation means and for providing said carry bit as input to said second summation means during a subsequent calculation.

* * * * *